(12) United States Patent
Hansen, Sr.

(10) Patent No.: US 6,341,887 B1
(45) Date of Patent: Jan. 29, 2002

(54) ICE CREAM MIXING APPARATUS WITH A WASHING FUNCTION HAVING AN AUGER WITH A VANE WHEEL

(75) Inventor: Asbjørn Hansen, Sr., Drammen (NO)

(73) Assignee: Marienlyst Eiendom AS, Drammen (NO)

( * ) Notice: Subject to any disclaimer, the term of this patent is extended or adjusted under 35 U.S.C. 154(b) by 0 days.

(21) Appl. No.: 09/466,057

(22) Filed: Dec. 17, 1999

Related U.S. Application Data

(60) Provisional application No. 60/112,992, filed on Dec. 18, 1998.

(30) Foreign Application Priority Data

Dec. 18, 1998 (NO) .......................................... 19986005

(51) Int. Cl.⁷ ............................. B01F 7/24; B01F 15/00
(52) U.S. Cl. ..................... 366/138; 366/286; 366/319
(58) Field of Search ............................ 366/138, 144, 366/186, 203, 286, 289, 318, 319, 332, 333; 134/166 R, 169 R; 99/348, 460, 466; 426/518, 519; 222/413; 62/68, 320, 342, 343

(56) References Cited

U.S. PATENT DOCUMENTS

| | | | |
|---|---|---|---|
| 2,094,354 A | * | 9/1937 | Genova |
| 2,282,862 A | * | 5/1942 | Genova |
| 2,415,585 A | * | 2/1947 | Genova |
| 3,061,279 A | * | 10/1962 | Reed |
| 3,323,320 A | * | 6/1967 | Conz |
| 3,653,549 A | * | 4/1972 | Cannon ....................... 134/107 |
| 4,448,114 A | * | 5/1984 | Mayer ......................... 366/318 |
| 4,506,988 A | * | 3/1985 | Reed ........................... 366/203 |
| 4,548,054 A | | 10/1985 | Levine |
| 4,580,905 A | | 4/1986 | Schwitters et al. |
| 4,637,221 A | | 1/1987 | Levine |
| 4,671,172 A | * | 6/1987 | Stiglich ....................... 366/197 |
| 4,693,611 A | * | 9/1987 | Verkler ....................... 222/413 |
| 4,708,489 A | | 11/1987 | Carlson |
| 4,740,088 A | * | 4/1988 | Kelly, Jr. .................... 366/138 |
| 4,755,060 A | * | 7/1988 | Pedersen .................... 366/286 |
| 4,974,965 A | | 12/1990 | Heinhold et al. |
| 5,067,819 A | * | 11/1991 | Heinhold et al. ........... 366/203 |

FOREIGN PATENT DOCUMENTS

| | | | |
|---|---|---|---|
| CA | 1011727 | | 6/1977 |
| FR | 2717988 | | 3/1994 |
| FR | 2736511 | | 7/1995 |
| JP | 10000058 A | | 6/1998 |
| NO | 2446474 | | 10/1973 |
| NO | 2433362 | | 8/1978 |
| WO | 91/06221 | * | 5/1991 |

* cited by examiner

Primary Examiner—Charles E. Cooley
(74) Attorney, Agent, or Firm—Birch, Stewart, Kolasch & Birch, LLP

(57) ABSTRACT

An ice cream mixing apparatus comprises a funnel for holding ice cream and flavor additives, an auger and a linear actuator for moving the auger into the funnel, in which position a rotation of the auger will mix the ice cream and the flavor additives. The funnel forms part of an enclosure with at least one spray nozzle for pointing a water spray at the auger for washing purposes. The auger has at least one vane in an area which is hit by the water spray during the relative movement of the funnel and auger, causing a deflection of the water spray.

20 Claims, 3 Drawing Sheets

ICE CREAM MIXING APPARATUS WITH A WASHING FUNCTION HAVING AN AUGER WITH A VANE WHEEL

This application is based on provisional application No. 60/112,992 filed Dec. 18, 1998.

Field of the Invention

An ice cream mixing apparatus for mixing ice cream with one or more flavor additives comprises a funnel for holding the ice cream and the flavor additives, an auger with a spindle for creating a mixing action, an auger driver for rotating the auger spindle, and a linear actuator for relative movement of the funnel and auger into a position in which the auger is telescoped into the funnel, in which position a rotation of the auger will mix the ice cream and the flavor additives.

The ice cream will normally be in hard form, while the flavor additives may be fruits or nuts. The result of such a mixing is a semiliquid ice cream in which the flavor additives are more or less distributed, which may be sold to consumers.

BACKGROUND OF THE INVENTION

Such apparatuses are known from a number of patents. U.S. Pat. No. 4,548 054, U.S. Pat. No. 4,637,221, U.S. Pat. No. 4,708,489 and U.S. Pat. No. 4,974,965 all describe machines or apparatuses comprising an auger or agitator with a helical thread or cutter extending into a funnel or container for holding the ice cream and additives. The auger and funnel are relatively rotatable, and after some rotation the ice cream and additives have obtained a semiliquid condition which is attractive to consumers.

All these apparatuses are however encumbered with the drawback that after some use bacteriological growth will take place, which may constitute a health risk to the consumer. To prevent this bacteriological growth manual washing is required, which is time consuming and encumbered with the drawback that the result depend very much of the care of the operator.

U.S. Pat. No. 4,637,221 describes a rinsing process in which the operator by activating a switch can initiate a rinsing of the auger and funnel by tap water. The purpose of the rinsing is to remove residues of ice cream to prevent intermixing of flavors. The activating is manual, and thus the intervals between each rinsing is dependent upon the operator.

Modern health regulations require the bacteriological level to be below certain maximum values, which cannot be assured with prior art ice cream mixing apparatuses. Prior art ice cream mixing apparatuses are thus unsuitable in areas where such regulations apply.

SUMMARY OF THE INVENTION

The object of the invention is to provide an ice cream mixing apparatus for mixing ice cream with one or more flavor additives, in which the bacteriological level can be kept below a certain maximum value. The object is further that the bacteriological level shall be kept below the certain maximum value independent of the operator. The object is further that the ice cream mixing apparatus shall also comprise means for preventing intermixing of different flavor additives without having to initiate a thorough and time consuming complete washing.

The invention thus has an ice cream mixing apparatus for mixing ice cream with one or more flavor additives, comprising a funnel for holding the ice cream and the flavor additives, an auger with a spindle for creating a mixing action, an auger driver for rotating the auger spindle, and a linear actuator for relative movement of the funnel and auger into a position in which the auger is telescoped into the funnel, in which position a rotation of the auger will mix the ice cream and the flavor additives. The funnel forms part of an enclosure with a closable inlet for the ice cream and at least one spray nozzle for pointing a water spray at the auger for washing purposes. Further the auger or the auger spindle has at least one vane in an area which will be hit by the water spray during the relative movement of the funnel and auger, causing a deflection of the water spray. This spraying may take place during a period when the mixing apparatus is not used for mixing ice cream.

Preferably the at least one vane is located in or adjacent to a transition area between the auger and the auger spindle. The vane or vanes have surfaces which direct the water spray towards the auger spindle and the ice cream inlet, and in order to enable a thorough spraying of internal parts of the funnel, there should preferably be more than one vane. The vanes may be formed by a vane wheel, which may be mounted on the auger spindle.

Preferably the water supply to the spray nozzle includes a heated water supply, with temperature between 40° C. and 75° C., preferably between 50° C. and 70° C. and most preferred between 60° C. and 65° C., as this has been found to be most beneficial for removing ice cream residues without causing the ice cream residues to coagulate. The heated water spraying removes residue ice cream from the funnel and provides a thorough washing in which bacteria and the basis for bacteriological growth are removed, thereby keeping the bacteriological level below a certain maximum value. The heated water supply may be achieved by a connection to a hot water tap, or a separate heater which heats cold water.

A cold water supply as well as a liquid detergent supply may also be included in the supply to the spray nozzle. The liquid detergent may be sprayed on the aiuger and funnel prior to, together with or in between the heated water spraying, which enhances the washing and further reduces the bacteriological level.

Electric circuitry comprising switches and control valves may be used for manually or automatically controlling the supply to the at least one spray nozzle. This electric circuitry preferably forms part of a control system comprising an electronic control unit, a power supply and a control panel with control buttons and control lights, for controlling electrical equipment.

The control system may initiate a heated water spraying on a regular timer basis by a timer in the electronic control unit. Preferably a complete washing sequence as a minimum comprising a cold water spraying, a liquid detergent spraying and a heated water spraying is initiated on a regular timer basis. Thereby the washing function is independent of the operator.

A cold water spraying, i.e. a rinsing of the funnel, may be initiated manually between mixing of ice cream with different flavor additives. The cold water spraying may be of a shorter duration than the complete washing, yet the cold water spraying will be sufficient to remove enough residues in the funnel to prevent intermixing of ice cream with different flavors.

The auger driver may be adapted to rotate the auger spindle at variable speeds, e.g. two different speeds, enabling a fast rotation of the auger when there are no or little resistance to the rotation, and a slow rotation of the auger when there is a resistance to the rotation caused by the ice cream.

Further scope of the applicability of the present invention will become apparent from the detailed description given hereinafter. However, it should be understood that the detailed description and specific examples, while indicating preferred embodiments of the invention, are given by way of illustration only, science various changes and modifications within the spirit and scops of the invention will become apparent to those skilled in the art from this detailed description.

The invention will now be explained by a description of a preferred embodiment with reference to the accompanying drawings which are given by way of illustration only, and thus are not limitative of the present invention.

DESCRIPTION OF THE PREFERRED EMBODIMENTS

Figure 1:
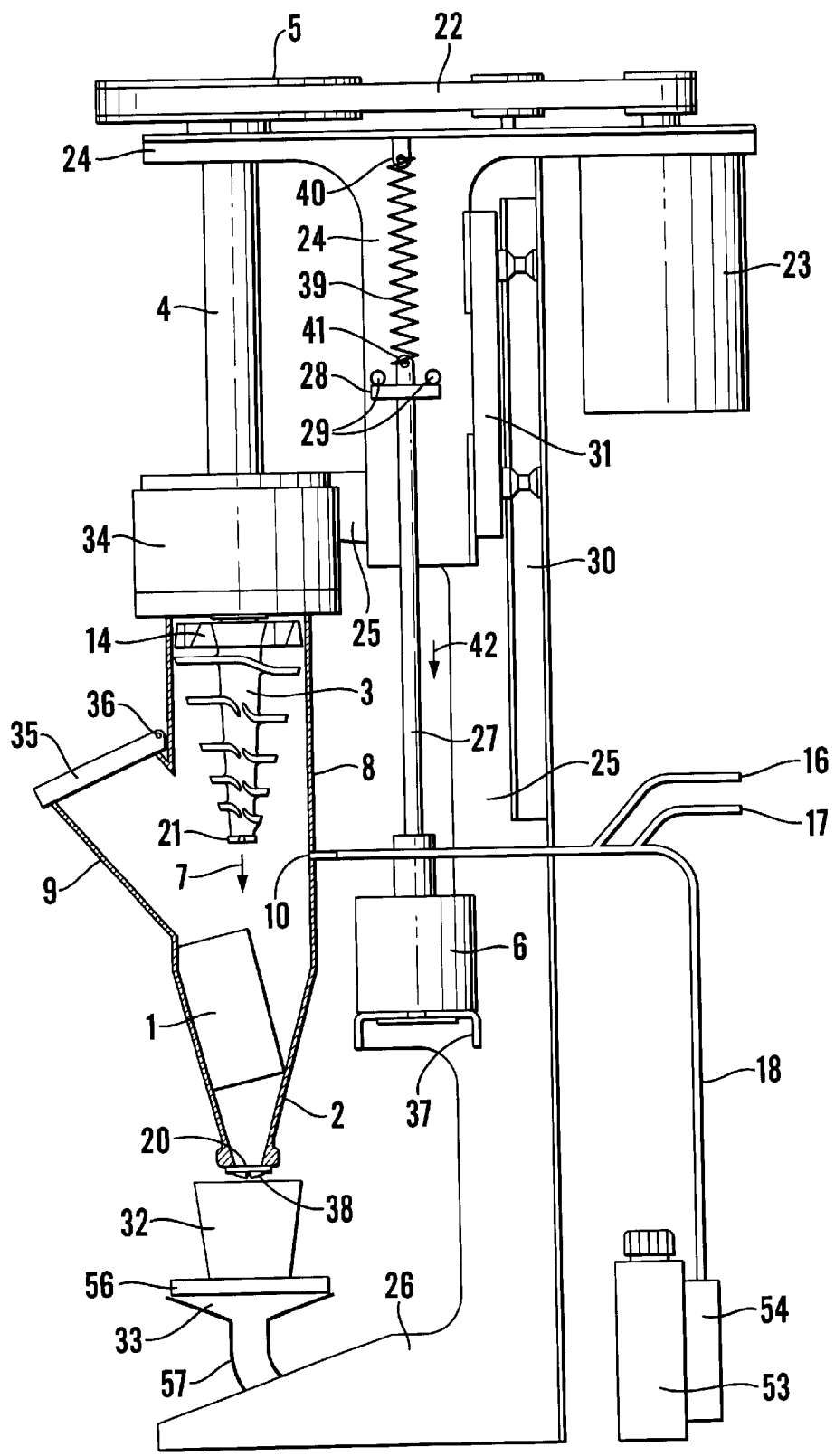
FIG. 1 is a schematic side view of an ice cream mixing apparatus according to the invention.

FIG. 1 is a schematic side view of an ice cream mixing apparatus for mixing ice cream with one or more flavor additives according to the invention, illustrating the principal parts. The ice cream mixing apparatus comprises a frame 25 with a foot 26 for placing on a not illustrated support, e.g. a table. A funnel 2 for holding the ice cream and flavor additives is supported by an auger bearing box 34, which is supported by the frame 25. An essentially vertical auger 3 with its spindle 4 is rotatably supported by journal bearings in the auger bearing box 34, and axially supported by a driver bracket 24. The driver bracket 24 also supports an auger driver 5, which has an auger motor 23 and a sheave/ belt transmission 22 for transferring rotational movement to the auger spindle 4.

The funnel 2 forms part of an enclosure 8 with a closable inlet 9 which is slanting upwards, and which can be closed by a lid 35 which is hinted to the inlet 9 in a hinge 36. A funnel outlet 20 with an ice cream nozzle 38 points at a cup 32 which is placed in a cup holder 56. The cup holder is perforated to allow wash water and spilt ice cream to flow to a sink 33 and further to a drain conduit 57.

A linear actuator 6, which may be a pneumatic cylinder, or preferably an electrically operated linear actuator, is attached to the apparatus frame 25 via an actuator bracket 37. An actuator rod 27 extends vertically oriom the linear actuator 6, and is connected to a spring means 39 in a lower spring attachment 41. The spring means 39 is attached to the driver bracket 24 in an upper spring 1attachment 40, and thus the spring means 39 is arranged between the linear actuator 6 and the driver bracket 24. The driver bracket 24 is attached to a slide bracket 31 which via a rail 30 which is fixed to the frame 25 is slidingly guided in a vertical direction, illustrated by an arrow 42.

In FIG. 1 the spring means 39 is illustrated in its retracted position. Corresponding stopper elements formed by a stopper bar 28 on the actuator rod 27 and stopper bolts 29 on the driver bracket 24 are in engagement and prevent a retraction of the spring means 39 beyond its retracted position. In this position the spring means 39 is somewhat pretensioned, in order to prevent play during initial extension of the spring means.

In FIG. 1 the linear actuator 6, i.e. the actuator rod 27, is illustrated in an upper position, and the auger 3 is illustrated in a corresponding position outside the funnel 2. An activating of the linear actuator 6 causes the actuator rod 27 to move down, in the direction illustrated by arrow 42. The movement of the actuator rod 27 is via the spring means 39 transferred to the driver bracket 24, causing the driver bracket with the shave/belt transmission 22, the motor 23 and the auger spindle 4 to move down, in the direction of the arrow 42. The auger 3 thus moves down as illustrated by arrow 7, and hits a block of ice cream 1 which is located in the funnel 2. If the ice cream is hard, which it normally will be to a certain extent, a further movement of the auger 3 will be prevented, causing an extension of the spring means 39. A further movement of the actuator rod 27 in direction 42 will further extend the spring means 39, which exerts a tension force which tries to forces the auger 3 into the ice cream 1.

The auger 3 is simultaneously rotated, which softens the ice cream 1. The spring means retracts and forces the auger 3 into the ice creams 1, and after some time the auger 3 is telescoped into the funnel 2. When the end 21 of the auger 3 reaches the bottom of the funnel. The sprint means 39 will again be in the retracted position, and the stopper bar 28 and the stopper bolts 29 will again be in engagement. A reversing of the linear actuator 6, i.e. a movement of the actuator rod 27 in the direction opposite the arrow 42. will withdraw the auger 3 from the funnel 2.

FIG. 1 also illustrates a spray nozzle 10 for pointing a water spray at the auger 3 for washing purposes A vane wheel 14 is located in a transition area between the auger 3 and the auger spindle 4, causing a deflection of the water spray during a movement of the auger 3 past the spray nozzle 10. A heated water supply 16; a cold water supply 17 and a liquid detergent supply 18, in which liquid detergent is supplied from a liquid detergent container 53 via a pump 54, and corresponding not illustrated control valves, allow various spraying concepts to be used for washing, or rinsing the enclosure 8 and the auger 3 between the ice cream mixing.

The ice cream mixing apparatus also includes electric circuitry with a programmable electronic control unit, a power supply, switches, pushbuttons and lamps. In order not to overload FIG. 1, these items are left out. The electronic control unit may include microelectronics for both manual and automatic activation of the linear actuator, switches, lamps, motors and control valves. The automatic activation can be based on input from sensors or a timer and include sequencing of functions. These items as well as their functioning and physical arrangement are conventional, and do not form a part of the invention.

In use the operator puts a charge of ice cream 1, typically hard ice cream, and a charge of flavor additive, typically fruit, berries or nuts (not illustrated), into the inlet 9. He then pushes a button which activates the auger motor 23 and the linear actuator 6, and the auger 3 enters the funnel 2, as explained above. The rotation of the auger 3 causes a mixing of the ice cream 1 and the flavor additives into a semiliquid mixture which after a certain time, e.g. 5 seconds, is poured out through the outlet 20 and into the cup 32 for consumption. The nozzle 38, which may have the shape of e.g. a star, gives the ice cream mixture the desired shape.

The auger driver 5 may be adapted to rotate the auger spindle 4 at variable speeds or two or more fixed different speeds. This can be achieved by a multispeed motor, or a shiftings in the sheave/belt transmission 22. Preferably the mixing of the ice cream 1 is carried out by operating the auger 3 at a low speed during a fast movement of the linear actuator 6 during a first phase of the ice cream mixing, and operating the auger 3 at a high speed during a slow movement of the linear actuator 6 during a second phase of the ice cream mixing. as this ensures a quick mixing without overloading the auger driver.

Figure 2:
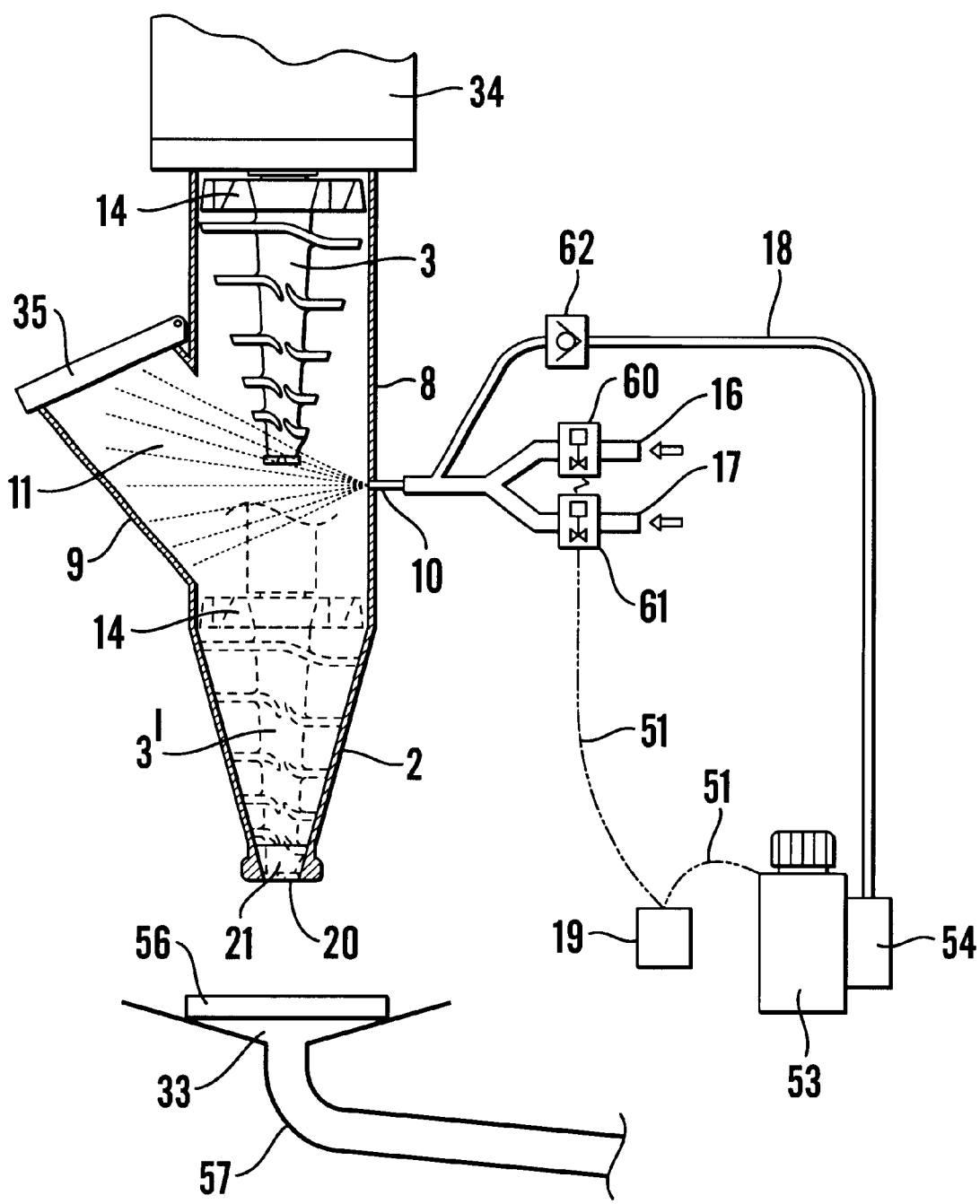
FIGS. 2 and 3 are side views of the ice cream mixing apparatus, illustrating washing.
Figure 3:
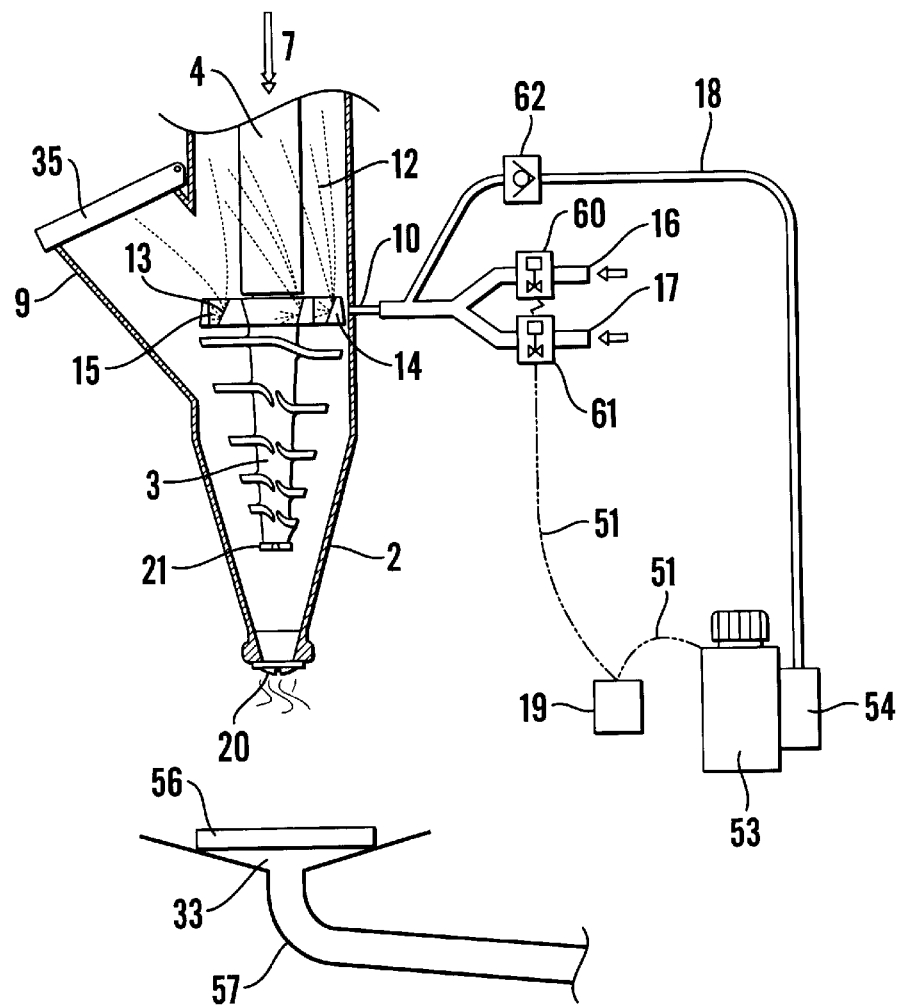

FIGS. 2 and 3 illustrates spraying of the auger and the funnel and items associated with the spraying.

The spray nozzle 10 is connected to the heated water supply 16 via a control valve 60, the cold water supply 17 via a control valve 61 and the liquid detergent supply 18 via a check valve 62. The cold and heated water supplies may be connected to external water taps, or containers in the apparatus The water and the liquid detergent may be supplied by any kind of conduct. e.g. plastic hoses or tubing. The control valves 60 and 61 are solenoid valves which can be electrically activated by electric circuitry 51 from the control unit 19. The electric circuitry 51 can also activate the pump 54 to supply liquid detergent from the liquid detergent container 53. The liquid detergent container 53 is filled manually when necessary.

In FIG. 2 the auger is identified with 3 in a position outside the funnel 2, and with 3' in a position within the funnel. In both these positions of the auger, a water spray 11 from the spray nozzle 10 hits the funnel essentially opposite the nozzle.

In FIG. 3 the auger 3 is in an intermediate position, on its way to one of the positions illustrated in FIG. 2. In this intermediate position the vane wheel 14 is hit by the water spray from the nozzle 10, and a deflected, distributed water spray 12 directed towards the auger spindle 4 and the ice cream inlet 9 is formed. In this way, areas of the funnel and the auger which are not hit by the direct spray 11 are also washed. Preferably the auger is rotated during the spraying, causing the spray to be directed at different points of the funnel and auger.

The at least one vane must be located in an area which will be hit by the water spray 11 during the relative movement of the funnel 2 and auger 3. A location in or adjacent to a transition area between the auger 3 and the auger spindle 4 is preferred.

Figure 4:
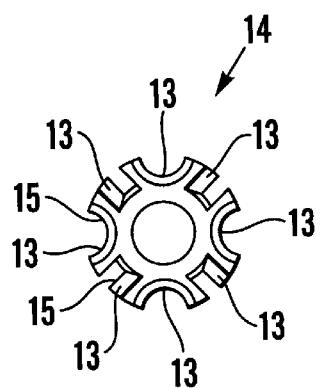
FIG. 4 is a plan view of a vane wheel.

The auger 3 or the auger spindle 4 should have at least one vane. FIG. 4 illustrate a vane wheel 14, including eight vanes 13. The vanes 13 have surfaces 15 pointing in different directions. for directing the water spray in different directions. The vane or vanes may be designed as straight, angled or cursed blades or surfaces of a base portion. In the illustrated example the base portion of the vanes is the vane wheel itself. It should be understood, however, that several vane arrangements are possible. and that the vane or vanes may e.g. be formed integral with the aug,er or the auger spindle.

FIGS. 1–3 illustrate only one spray nozzle 10. More than one nozzle is however conceivable, to improve the washing efficiency. The illustrated nozzle 10 is located besides the auger 3. Alternatively or additionally one or more nozzles may be located above the auger 3, to point a water spray down.

Cold water washing or rinsing may be initiated by the operator between mixing of ice cream with different flavor additives, in order to prevent intermixing of the additives. The control unit 19 then energises the cold water control valve 61 and starts the auger 3, thereby spraying the funnel 2 and auger 3 with cold water while the auger is rotating. A timer function in the control unit ensures that the cold water washing is maintained for a predetermined period, typically 20 seconds. The wash water is discharged to the sink 33 and further to the drain conduit 57.

At predetermined intervals, typically I hour, a heated water wash is initiated by a timer in the control unit As a minimum the heated water wash comprises a heated Hater spraying. Preferable the heated water wash includes a washing sequence comprising a cold water spraying, a liquid detergent sprain, and a heated water spraying. The washing may also include rotating the auger, which as mentioned above, may be rotated at variable or different fixed speeds.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

At least the heated water wash, but also the cold water rinsing. may be accompanied baa a linear movement of the auger 3, causing the vane to pass the nozzle 10 and deflect the water spray.

In a preferred embodiment the end 21 at the apex of the auger 3 is adapted to close the funnel outlet 20 when the augei is telescoped completely into the funnel 2 This allows filling the funnel with heated or cold water, and rotating the auger. Such a rotation will create a water swirl which due to the centrifugal action will wash the funnel thoroughly. The central portion of the augel will, however, be better washed by a rotation of the auger during the spraying. The washing sequence may include both spraying the auger while it is rotating and filling the funnel with water and rotating the auger, in order to wash all parts thoroughly.

A heated water wash, or a sequence including a heated water wash, may also be manually initiated by a push button.

Thus a number of different washing sequences is possible. The steps of the washing sequence as well as their lengths are controlled by the control unit, and different washing sequences may be realised by different programming of the control unit.

The heated water should preferably have a temperature between 40° C. and 75° C., preferably between 50° C. and 70° C. and most preferred between 60° C. and 65° C., as this have been found to ensure proper washing without causing the substances in the ice cream to coagulate. This temperature can be achieved by a heater which heats cold water and is controlled by a thermostat that ensures the correct temperature. or a mixing element which mixes hot tap water with cold tap water to the correct temperature.

A number of additional functions may be included in the control unit, e.g. pulsing of liquid detergent with predetermined intervals during the heated water wash, and logical checks to ensure that neither ice cream mixing, cold water wash nor heated water wash may be initiated while one of these processes are ongoing.

The Invention has in the above been described with reference to an ice cream mixing apparatus in which the funnel is stationary, and the auger is essentially vertical and telescoped into the funnel from above by a linear actuator. It should however be understood that the invention will be equally applicable for an ice cream mixing apparatus with an auger with a different orientation, e g horizontal, and a different principle for creating the relative movement for telescoping the auger into the funnel, e.g. by moving the funnel.

What is claimed is:

1. An ice cream mixing apparatus for mixing ice cream with one or more flavor additives, comprising:

a funnel for holding the ice cream and the flavor additives;

an auger with a spindle for creating a mixing action;

an auger driver for rotating the auger spindle;

a linear actuator for relative movement of the funnel and auger into a position in which the auger is telescoped into the funnel, in which position a rotation of the auger will mix the ice cream and the flavor additives;

the funnel forming a part of an enclosure with a closable inlet for the ice cream;

at least one spray nozzle for pointing a water spray at the auger for washing purposes; and at least one vane formed by a vane wheel on the auger or the auger spindle in an area which will be hit by the water spray during the relative movement of the funnel and auger, causing a deflection of the water spray.

2. The apparatus according claim 1, wherein the at least one vane is located in or adjacent to a transition area between the auger and the auger spindle.

3. The apparatus according to claim 1, wherein the at least one vane has a surface which directs the water spray towards the auger spindle and the ice cream inlet.

4. The apparatus according to claim 3, wherein the at least one vane surface is a straight, angled or curved surface of a blade or base portion.

5. The apparatus according to claim 1, further comprising a heated water supply to the spray nozzle.

6. The apparatus according to claim 5, further comprising a temperature regulator for the heated water for keeping the water temperature between 40° C. and 75° C.

7. The apparatus according to claim 6, wherein the temperature regulator keeps the water temperature between 50°°C. and 70° C.

8. The apparatus according to claim 6, wherein the temperature regulator keeps the water temperature between 60° C. and 65° C.

9. The apparatus according to claim 1, further comprising a cold water supply to the spray nozzle.

10. The apparatus according to claim 1, further comprising a liquid detergent supply to the spray nozzle.

11. The apparatus according to claim 1, further comprising an electric circuitry comprising switches and control valves for manually controlling the supply to the at least one spray nozzle.

12. The apparatus according to claim 1, further comprising an electric circuitry comprising a control unit, switches and control valves for automatically controlling the supply to the at least one spray nozzle.

13. The apparatus according to claim 1, further comprising a control unit for initiating a heated water spraying on a regular timed basis.

14. The apparatus according to claim 1, further comprising a control unit for initiating a washing sequence comprising a cold water rinsing, a liquid detergent spraying and a heated water washing on a regular timed basis.

15. The apparatus according to claim 1, wherein the auger driver is adapted to rotate the auger spindle at a variable speed or fixed different speeds.

16. The apparatus according to claim 1, further comprising a control unit which controls the speed of the auger and the linear actuator during mixing of the ice cream, the control unit operates the auger at a low speed during a fast movement of the linear actuator during a first phase of the ice cream mixing, and operates the auger at a high speed during a slow movement of the linear actuator during a second phase of the ice cream mixing.

17. The apparatus according to claim 1, wherein the auger spindle is essentially vertical, the funnel has a lower outlet for the mixed ice cream, and an end of the auger opposite the spindle closes the funnel outlet when telescoped completely into the funnel.

18. The apparatus according to claim 1, wherein the auger spindle is essentially vertical, and the ice cream inlet slants upwards.

19. The apparatus according to claim 1, wherein at least one spray nozzle is located beside the auger.

20. The apparatus according to claim 1, wherein the at least one spray nozzle is located above the auger.

* * * * *